(12) United States Patent
Kitao (10) Patent No.: US 7,360,886 B2
(45) Date of Patent: Apr. 22, 2008

(54) POSITION DEVIATION DETECTING METHOD AND IMAGE FORMING DEVICE

(75) Inventor: Katsuyuki Kitao, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 425 days.

(21) Appl. No.: 11/057,545

(22) Filed: Feb. 15, 2005

(65) Prior Publication Data

US 2005/0195235 A1  Sep. 8, 2005

(30) Foreign Application Priority Data

Feb. 20, 2004  (JP) ............................. 2004-045077

(51) Int. Cl.
| | |
|---|---|
| *B41J 29/393* | (2006.01) |
| *G03G 15/00* | (2006.01) |
| *G03G 15/01* | (2006.01) |
| *H04N 1/58* | (2006.01) |

(52) U.S. Cl. ..................... 347/103; 399/49; 399/301; 399/60; 347/19

(58) Field of Classification Search ................. 347/103
See application file for complete search history.

(56) References Cited

U.S. PATENT DOCUMENTS

| 5,722,009 A | * | 2/1998 | Haneda et al. ................. 399/60 |
| 6,198,896 B1 | * | 3/2001 | Nakayasu et al. ........... 399/301 |
| 6,408,156 B1 | | 6/2002 | Miyazaki et al. |
| 2003/0210412 A1 | * | 11/2003 | Ishibashi ..................... 358/1.9 |
| 2005/0031361 A1 | * | 2/2005 | Kobayashi ................... 399/49 |

FOREIGN PATENT DOCUMENTS

| EP | 1 074 894 A2 | | 2/2001 |
| JP | 2001249513 A | * | 9/2001 |
| JP | 3266849 | | 1/2002 |
| JP | 3353629 | | 9/2002 |
| JP | 3518825 | | 2/2004 |

* cited by examiner

*Primary Examiner*—Matthew Luu
*Assistant Examiner*—John P Zimmermann
(74) *Attorney, Agent, or Firm*—Oblon, Spivak, McClelland, Maier & Neustadt, P.C.

(57) ABSTRACT

In a position deviation detecting method for an image forming device, first and second patterns formed in different colors on image supporting mediums are transferred to an intermediate transfer medium in an overlapping manner, the first patterns formed in a color with high sensor sensitivity and the second patterns formed in a color with low sensor sensitivity. The first and second patterns on the transfer medium are read using a light-receiving unit of a pattern detection sensor. An amount of position deviation in a main scanning direction between two of a plurality of colors is detected. The first patterns are set in a fixed position in the main scanning direction and the second patterns are shifted. Output values of the light-receiving unit are measured from the first and second patterns, and the amount of position deviation in the main scanning direction is computed based the measured output values.

4 Claims, 11 Drawing Sheets

POSITION DEVIATION DETECTING METHOD AND IMAGE FORMING DEVICE

BACKGROUND OF THE INVENTION

1. Field of the Invention

The present invention relates to a position deviation detecting method for use in an image forming device which forms a multi-color or color image, and relates to an image forming device using the position deviation detecting method.

2. Description of the Related Art

As for the color image forming device, it is important to eliminate the color deviation between the output images of the magenta, the cyan, the yellow and the black on the transfer medium, for the purpose of upgrading the image quality. Especially, the elimination of the color deviation is important in the four-drum tandem type color image forming device which is equipped with the set of the image supporting medium and the optical writing unit for each of the colors respectively. In this image forming device, the images of the different colors are formed through the optical writing units and the image supporting mediums, and the color deviation may take place due to the deviation of the transferring position when the image of each color is transferred one by one to the printing material with the intermediate transfer medium or the transfer medium. Thus, the elimination of the color deviation is the important problem.

There has been proposed the method of compensating the color deviation due to the deviation of the transferring position. In the proposed method, the pattern for position deviation detection is optically written to the image supporting medium, and the resulting latent image pattern is developed with the corresponding toner. After the development, the pattern of toner image is transferred to the intermediate transfer medium or the transfer medium, the pattern transferred to the intermediate transfer medium or the transfer medium is optically read by the pattern detection sensor which includes the light emitting device and the photodetector. Thereby, the amount of position deviation is detected by the pattern detection sensor, and the compensation of the color deviation is carried out in accordance with the writing timing or using the optical system compensation unit.

See Japanese Patent No. 3518825 (corresponding to Japanese Laid-Open Patent Application No. 09-244341), Japanese Patent No. 3266849 (corresponding to Japanese Laid-Open Patent Application No. 11-272037), and Japanese Patent No. 3353629 (corresponding to Japanese Laid-Open Patent Application No. 09-234905).

Figure 10:
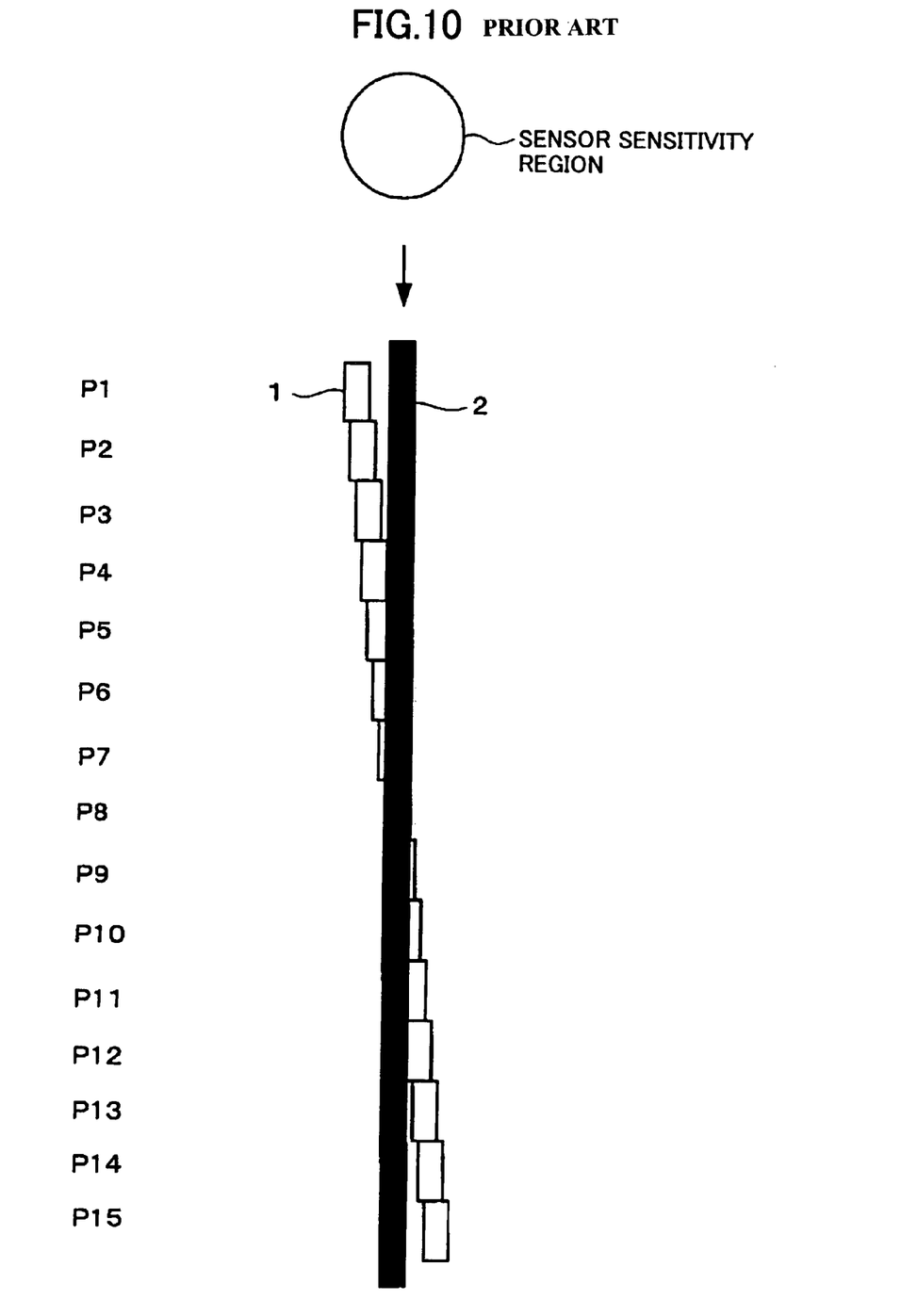
FIG. 10 is a diagram showing an example of the pattern according to the related art when detecting the amount of position deviation in the main scanning direction between two of the plurality of colors.

FIG. 10 shows an example of the pattern according to the related art when detecting the amount of position deviation in the main scanning direction between two of the plurality of colors.

The plurality of the patterns 1 and 2 of different colors are provided for detecting the amount of position deviation in the main scanning direction as shown in FIG. 10. These patterns are arranged in the vertical posture along the reading direction of the pattern detection sensor. The pattern detection sensor includes the light emitting device and the photo detector. As described above, the amount of position deviation in the main scanning direction is detected based on the respective outputs of the sensor when reading the detection patterns.

According to this method, the patterns 1 are made in the color with high sensor sensitivity (any of the magenta, the cyan, and the yellow) and the patterns 2 are made in the color with low sensor sensitivity (the black). The patterns 1 and 2 are arranged so that the patterns 2 of the color with low sensor sensitivity is set in the fixed position in the main scanning direction as the reference patterns, and the patterns 1 of the color with high sensor sensitivity are shifted relative to the patterns 2 and some of the patterns 1 are overlapped over the patterns 2 in the fixed position.

Figure 11:
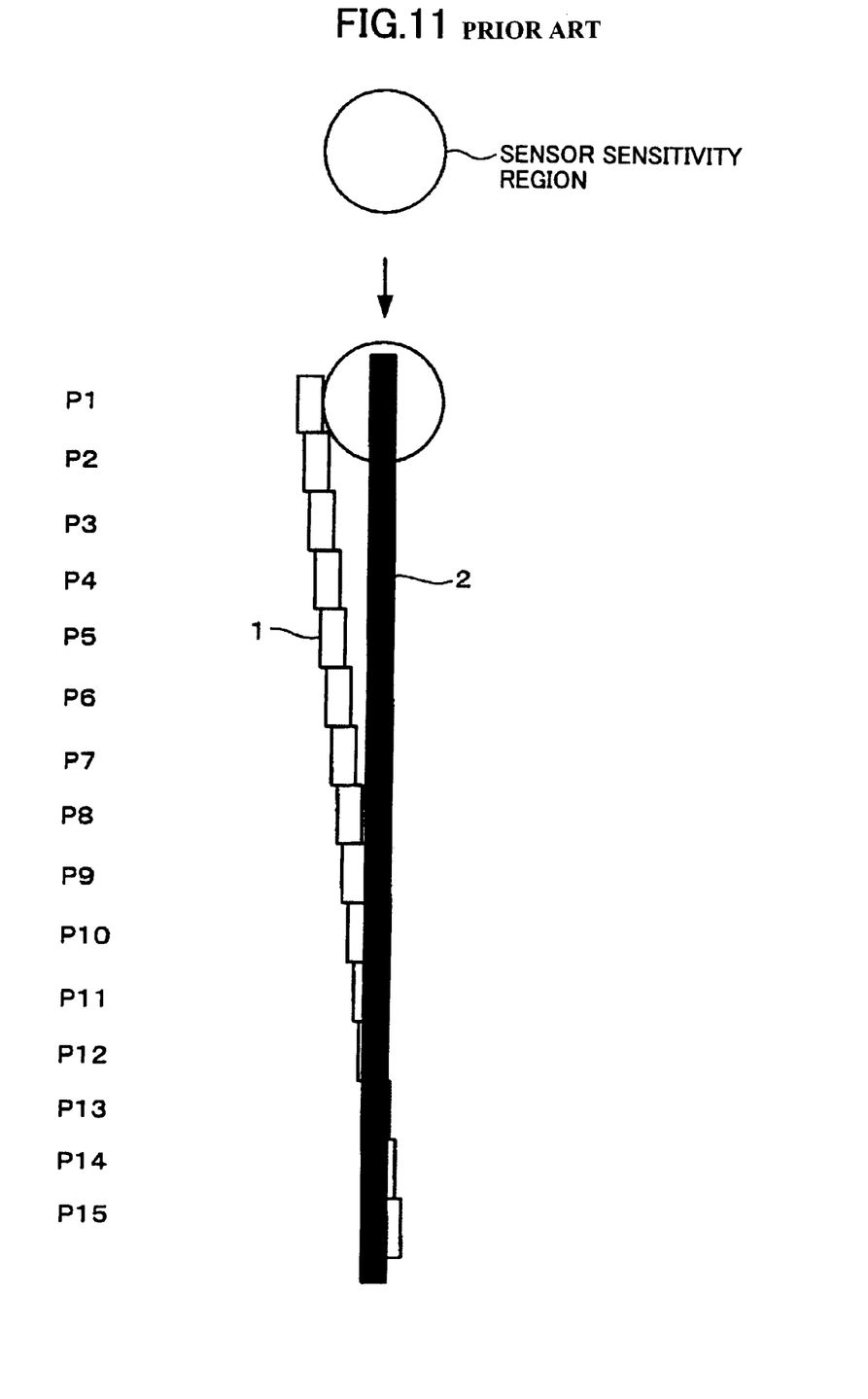
FIG. 11 is a diagram for explaining the case in which the position deviation arises with the pattern of FIG. 10.

In the above method, the patterns 1 and the patterns 2 are arranged in the above manner, and the amount of position deviation in the main scanning direction is measured. However, when the patterns 1 of the color with high sensor sensitivity greatly deviate from the patterns 2 in the fixed position, some of the patterns 1 are completely separated from the sensor sensitivity region as shown in FIG. 11, and it is difficult to attain the detection of the exact amount of position deviation.

Figure 12:
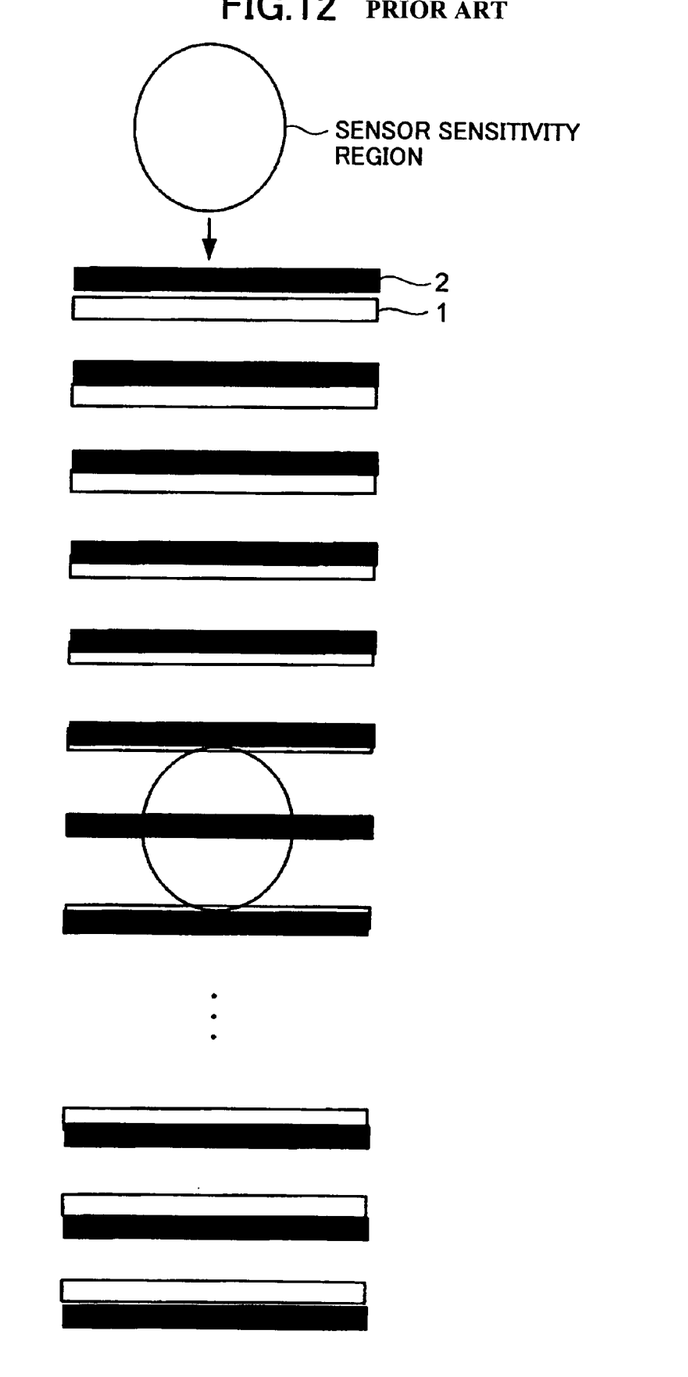
FIG. 12 is a diagram showing an example of the pattern according to the related art when detecting the amount of position deviation in the sub-scanning direction between two of the plurality of colors.

Moreover, FIG. 12 shows an example of the deviation detection patterns according to the related art when detecting the amount of position deviation in the sub-scanning direction between two of the plurality of colors.

The plurality of sets of the patterns 1 and 2 of different colors are provided for detecting the amount of position deviation in the sub-scanning direction as shown in FIG. 12. These patterns are arranged in the horizontal posture along the reading direction of the pattern detection sensor. The pattern detection sensor includes the light emitting device and the photo detector. As described above, the amount of position deviation in the sub-canning direction is detected based on the respective outputs of the sensor when reading the deviation detection patterns.

According to this method, the first interval at which the patterns 1 of the color with high sensor sensitivity are arranged is shifted slightly on the basis of the second interval at which the patterns 2 of the color with low sensor sensitivity are arranged as the reference patterns such that the first interval is smaller than the second interval. The overlapping amount of the pattern 1 and the pattern 2 of each set varies according to the reading direction of the sensor, the plurality of patches are formed with the sets of the patterns 1 and 2.

However, when the patterns 1 and the patterns 2 are arranged by this method to detect the amount of position deviation in the sub-scanning direction, the sensor sensitivity region in the neighborhood of the reference patch where the patterns 1 and 2 of the two colors completely match each other is affected by the outputs of the sensor from the patterns 1 of the color with high sensor sensitivity of the two patches adjacent to the reference patch, and it is difficult to attain the detection of the exact amount of position deviation.

SUMMARY OF THE INVENTION

An object of the present invention is to provide an improved position deviation detecting method in which the above-described problems are eliminated.

Another object of the present invention is to provide a position deviation detection method in which the amount of position deviation in the main scanning direction or the sub-scanning direction can be detected correctly, so that the reading error or the wrong detection can be reduced.

Another object of the present invention is to provide an image forming device which can reduce the occurrence of the color deviation using the above-mentioned the position deviation detecting method.

In order to achieve the above-mentioned object, the present invention provides a position deviation detecting method for use in an image forming device which forms a multi-color or color image on a printing material by transferring images of a plurality of colors, formed on image supporting mediums arranged in parallel, to the printing material which is conveyed with an intermediate transfer medium or a transfer medium such that the images are stacked together, the position deviation detecting method comprising the steps of: transferring first and second patterns formed in different colors on the image supporting mediums to the intermediate transfer medium or the transfer medium in an overlapping manner, the first patterns formed in a color with high sensor sensitivity and the second patterns formed in a color with low sensor sensitivity; reading the first and second patterns on the intermediate transfer medium or the transfer medium using a light-receiving unit of a pattern detection sensor; and detecting an amount of position deviation in a main scanning direction between two of the plurality of colors, wherein the first patterns are arranged in a fixed position in the main scanning direction and the second patterns are shifted in the main scanning direction such that the second patterns are overlapped over the first patterns, and output values of the light-receiving unit of the sensor are measured from the first and second patterns, and the amount of position deviation in the main scanning direction is computed based the measured output values.

According to the position deviation detecting method of the present invention, it is possible to correctly detect the amount of position deviation in the main scanning direction, so that the reading error or the wrong detection can be reduced.

In order to achieve the above-mentioned object, the present invention provides position deviation detecting method for use in an image forming device which forms a multi-color or color image on a printing material by transferring images for a plurality of colors, formed on image supporting mediums arranged in parallel, to the printing material which is conveyed with an intermediate transfer medium or a transfer medium such that the images are stacked, the position deviation detecting method comprising the steps of: transferring first and second patterns formed in different colors on the image supporting mediums to the intermediate transfer medium or the transfer medium in an overlapping manner, the first patterns formed in a color with high sensor sensitivity and the second patterns formed in a color with low sensor sensitivity; reading the first and second patterns on the intermediate transfer medium or the transfer medium using a light-receiving unit of a pattern detection sensor; and detecting an amount of position deviation in a sub-scanning direction between two of the plurality of colors, wherein the first patterns are arranged in horizontal posture at intervals of a first distance along the sub-scanning direction and the second patterns are arranged in horizontal posture at intervals of a second distance smaller than the first distance along the sub-scanning direction, and each second pattern is shifted from each first pattern such that an overlapping amount of the first pattern and the second pattern varies according to the sub-scanning direction and a plurality of patches are formed, and output values of the light-receiving unit of the sensor are measured from the first and second patterns, and the amount of position deviation in the sub-scanning direction is computed based the measured output values.

According to the position deviation detecting method of the present invention, it is possible to correctly detect the amount of position deviation in the sub-scanning direction, so that the reading error or the wrong detection can be reduced.

In order to achieve the above-mentioned object, the present invention provides an image forming device which forms a multi-color or color image on a printing material by transferring images in a plurality of colors, formed on image supporting mediums arranged in parallel, to the printing material which is conveyed with an intermediate transfer medium or a transfer medium such that the images are stacked, the image forming device comprising: a deviation-detection-pattern printing unit transferring first and second patterns formed in different colors on the image supporting mediums to the intermediate transfer medium or the transfer medium in an overlapping manner, the first patterns formed in a color with high sensor sensitivity and the second patterns formed in a color with low sensor sensitivity; and a pattern detection sensor including a light-emitting unit and a light-receiving unit, the light-receiving unit reading the first and second patterns on the intermediate transfer medium or the transfer medium using a light-receiving unit of a pattern detection sensor; wherein the pattern detection sensor detects an amount of position deviation in a main scanning direction between two of the plurality of colors, and wherein the first patterns are arranged in a fixed position in the main scanning direction and the second patterns are shifted in the main scanning direction such that the second patterns are overlapped over the first patterns, and output values of the light-receiving unit of the sensor are measured from the first and second patterns, and the amount of position deviation in the main scanning direction is computed based the measured output values.

In order to achieve the above-mentioned object, the present invention provides an image forming device which forms a multi-color or color image on a printing material by transferring images in a plurality of colors, formed on image supporting mediums arranged in parallel, to the printing material which is conveyed with an intermediate transfer medium or a transfer medium such that the images are stacked, the image forming device comprising: a deviation-detection-pattern printing unit transferring first and second patterns formed in different colors on the image supporting mediums to the intermediate transfer medium or the transfer medium in an overlapping manner, the first patterns formed in a color with high sensor sensitivity and the second patterns formed in a color with low sensor sensitivity; and a pattern detection sensor including a light-emitting unit and a light-receiving unit, the light-receiving unit reading the first and second patterns on the intermediate transfer medium or the transfer medium using a light-receiving unit of a pattern detection sensor; wherein the pattern detection sensor detects an amount of position deviation in a sub-scanning direction between two of the plurality of colors, and wherein the first patterns are arranged in horizontal posture at intervals of a first distance along the sub-scanning direction and the second patterns are arranged in horizontal posture at intervals of a second distance smaller than the first distance along the sub-scanning direction, and each second pattern is shifted from each first pattern such that an overlapping amount of the first pattern and the second pattern varies according to the sub-scanning direction and a plurality of patches are formed, and output values of the light-receiving unit of the sensor are measured from the first and second patterns, and the amount of position deviation in the sub-scanning direction is computed based the measured output values.

According to the image forming apparatus of the present invention, it is possible to reduce the occurrence of the color deviation using the above-mentioned the position deviation detecting method.

BRIEF DESCRIPTION OF THE DRAWINGS

Other objects, features and advantages of the present invention will be apparent from the following detailed description when reading in conjunction with the accompanying drawings.

DETAILED DESCRIPTION OF PREFERRED EMBODIMENTS

A description will now be given of the preferred embodiments of the invention with reference to the accompanying drawings.

First, the color copier device which is the tandem type image forming device using the intermediate transfer medium is mentioned as one preferred embodiment of the invention, and the composition and operation thereof will be explained.

Figure 1:
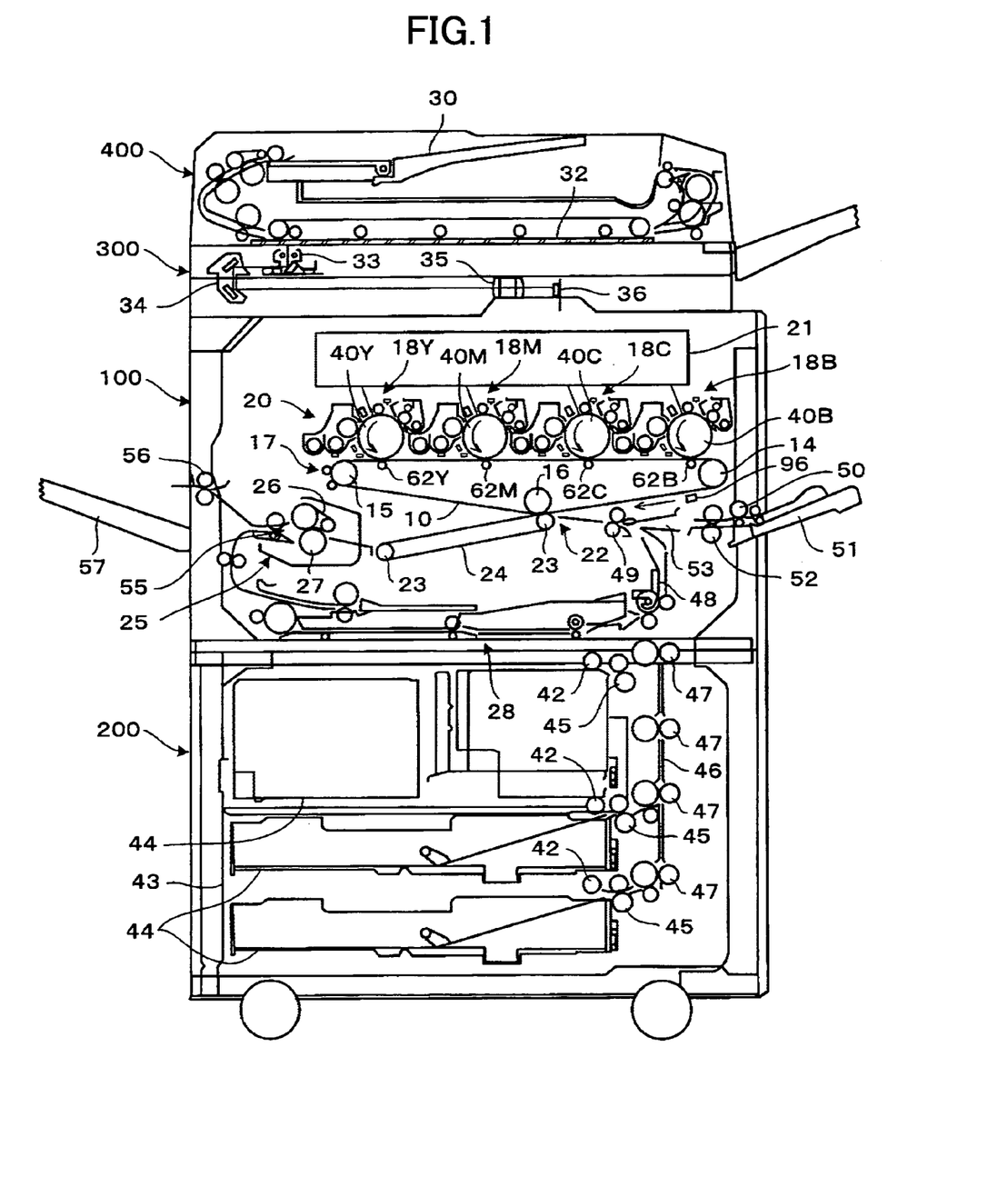
FIG. 1 is a diagram showing the composition of a color copier device in which the image forming device of the invention is embodied.

FIG. 1 shows the composition of the color copier device in which the image forming device of the invention is embodied.

In FIG. 1, the reference numeral 100 denotes the copier body (color printer section), 200 denotes the paper feed table on which the copier body 100 is mounted, 300 denotes the document reader (scanner) which is attached to the copier body 100, and 400 denotes the automatic document feeder (ADF) which is attached to the document reader 300.

The intermediate transfer medium (called the intermediate transferring belt) 10 which is a primary transferring unit in the form of an endless belt is disposed in the center of the copier body 100. As shown in FIG. 1, the intermediate transferring belt 10 is wound on the support rollers 14, 15, and 16, and supported to be rotatable in the clockwise rotation direction for conveyance of a latent image on the intermediate transferring belt 10.

In this example, the intermediate-transfer-medium cleaning device 17 is disposed on the left of the second support roller 15 among the three rollers, and this cleaning device 17 is provided to remove the remaining toner which remains on the intermediate transferring belt 10 after the image transferring.

Moreover, on the intermediate transferring belt 10 stretched between the first support roller 14 and the second support roller 15 among the three rollers, the four image-formation units (image-formation section of each color) 18Y, 18M, 18C, and 18B of the yellow (Y), the magenta (M), the cyan (C), and the black (B) are arranged side by side along the conveyance direction horizontally, and they form the tandem type image-formation section 20.

Incidentally, the order of the four colors is mentioned as a typical example, and the present invention is not limited to this embodiment.

Figure 2:
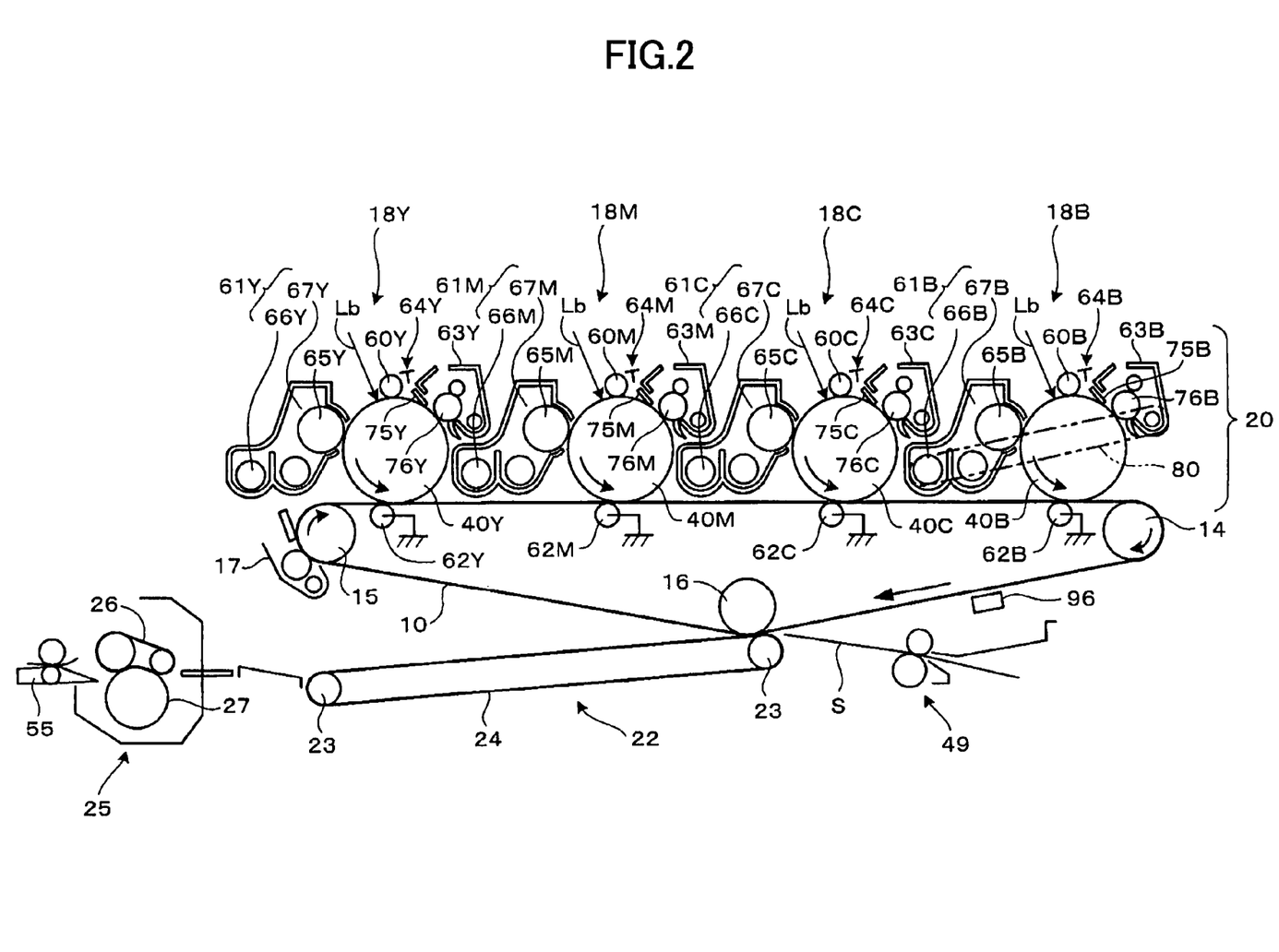
FIG. 2 is an enlarged diagram showing the principal part of the tandem type image-formation section in the color copier device of FIG. 1.

FIG. 2 is an enlarged diagram showing the principal part of the tandem type image-formation section 20 of the color copier device of FIG. 1.

The image-formation units 18Y, 18M, 18C, and 18B are the individual toner image formation units in the tandem type image-formation section 20. As shown in FIG. 2, around the photoconductor drums 40Y, 40M, 40C, and 40B which are drum-like image supporting mediums, the charging devices 60Y, 60M, 60C, and 60B, the developing devices 61Y, 61M, 61C, and 61B, the primary transferring devices (for example, transferring roller) 62Y, 62M, 62C, and 62B, the photoconductor cleaning devices 63Y, 63M, 63C, and 63B, and the electric dischargers 64Y, 64M, 64C, and 64B are disposed respectively. These components form the image-formation units 18Y, 18M, 18C, and 18B respectively.

In this embodiment, the charging devices 60Y, 60M, 60C, and 60B are the electrification rollers which are made of the roller-like charging material. The photoconductor drums 40Y, 40M, 40C, and 40B are charged by contacting these charging devices to the photoconductor drums 40Y, 40M, 40C, and 40B, and applying the electrical potential difference.

Alternatively, other than the electrification rollers, the electrification brushes may be used instead, and the charging of the photoconductive medium may be performed using the non-contact scorotron charger etc.

As shown in FIG. 1, the exposure device 21 is disposed above the tandem type image-formation section 20 as a unit which optically writes the photoconductive medium.

On the bottom side of the intermediate transferring belt 10 opposite to the tandem type image-formation section 20, the secondary transferring device 22 which is a secondary transferring unit is disposed.

In this embodiment, the secondary transferring device 22 is composed of the secondary transferring belt 24 which is the endless belt wound between the two rollers 23. The third support roller 16 is pressed against the secondary transferring belt 24 through the intermediate transferring belt 10, and the image on the intermediate transferring belt 10 is secondarily transferred to the printing material S (the recording paper, the OHP sheet, etc.).

Moreover, the fixing device 25 which carries out fixing of the transferred image on the printing material S is disposed beside the secondary transferring device 22. The fixing device 25 constitutes the pressure roller 27 which is pressed onto the fixing belt (or fixing roller) 26 as a fixing component.

The secondary transferring device 22 mentioned above is also equipped with the printing material conveyance function to convey the printing material S after the image transferring to the fixing device 25.

Alternatively, as a secondary transferring device 22, the transferring roller and the non-contact charger may be used instead, but it is difficult for such alternative device to have the printing material conveyance function also.

In addition, in the example of FIG. 1, on the bottom of such the secondary transferring device 22 and the fixing device 25, there is disposed, in parallel with the tandem type image-formation section 20, the printing material reversal device 28 which reverses the printing material S with which the image should be recorded on both sides of the printing material S.

When taking the copy using the above-described color copier device, the document is set on the document base 30 of the automatic document feeder (ADF) 400.

Or the automatic document feeder 400 is opened, the document is set on the contact glass 32 of the scanner 300, and the automatic document feeder 400 is closed and pressed down.

And the scanner 300 is driven, after conveying the document and moving to contact glass 32, when the start switch (not shown) is pushed and the document is set in the automatic document feeder 400.

Moreover, when the document is set on contact glass 32, the scanner 300 is driven, and, the first moving member 33 which carries the light source and the mirror, and the second moving member 34 which carries the two mirrors are driven immediately.

And while the light beam is emitted from the light source in the first moving member 33, the reflected light from the document is reflected by the mirror and reflected by the two mirrors of the second moving member 34 towards the second moving member 34, and passes through the focusing lens 35, and is incident to the reading sensor (color image pickup components, such as the color CCD) 36, so that the contents of the document are optically read.

The image-formation units 18Y, 18M, 18C, and 18B rotate the photoconductor drums 40Y, 40M, 40C, and 40B, respectively. The charging devices 60Y, 60M, 60C and 60B uniformly charge the front surfaces of the photoconductor drums 40Y, 40M, 40C, and 40B with the rotation of the photoconductor drums 40Y, 40M, 40C, and 40B.

According to the read information of the scanner 300, the exposure device 21 mentioned above irradiates the writing light Lb for every color by the semiconductor laser (LD), the light emitting diode (LED), etc. at the photoconductor drums 40Y, 40M, 40C, and 40B, respectively, and forms the electrostatic latent image for every color on the photoconductor drums 40Y, 40M, and 40C and 40B.

Next, the electrostatic latent images on the photoconductor drums 40Y, 40M, and 40C and 40B are developed by the developers supported by the developing rollers (development sleeves) 65Y, 65M, 65C, and 65B provided in the development regions 67Y, 67M, 67C, and 67B of the developing devices 61Y, 61M, 61C, and 61B.

The toner adheres to the electrostatic latent image, and the visible image is formed with the toner. Namely, the monochrome images of the yellow, the magenta, the cyan, and the black are formed respectively on the photoconductor drums 40Y, 40M, and 40C and 40B.

And the rotation drive of one of the support rollers 14, 15, and 16 is performed in accordance with the timing of the image-formation operation, and the following rotation of the other two support rollers is carried out.

The intermediate transferring belt 10 is rotated for conveyance of the toner image, and almost at the same time, the transferring bias voltage is applied to the transferring rollers 62Y, 62M, 62C, and 62B which are the primary transferring devices. The visible images on the photoconductor drums 40Y, 40M, 40C and 40B are transferred one by one to the intermediate transferring belt 10.

Accordingly, the composite color image which is integrated by the four colors is formed on the intermediate transferring belt 10. The remaining toner on the front surfaces of the photoconductor drums 40Y, 40M, 40C, and 40B after the image transferring is removed and cleaned with the photoconductor cleaning devices 63Y, 63M, 63C, and 63B. The photoconductor drum surfaces are electrically discharged with the electric dischargers 64Y, 64M, 64C, and 64B, and prepared for the image formation at the subsequent timing.

On the other hand, if the start switch (not shown) is pressed, the selective rotation of one of the feed rollers 42 of the feed table 200 is carried out, and the printing material S, such as the recording paper, is delivered from one of the feed cassettes 44 provided in the multi-stage on the paper bank 43, the printing material is separated one sheet by one sheet at a time with the separation roller 45, brought into the feed passage 46, and delivered with the conveyance roller 47 so that the sheet is led to the feed passage 48 in the copier body 100. The sheet is brought in contact with the resist roller 49 and stops there.

Or the printing material S on the manual document tray 51 is sent out with the feed roller 50, the sheet is separated one sheet by one sheet at a time with the separation roller 52, and sent to the feed passage 53. The sheet is brought in contact with the resist roller 49 and stops there.

At the timing synchronized with the composite color image on the intermediate transferring belt 10, the resist roller 49 is rotated, the printing material S is sent and placed between the intermediate transferring belt 10 and the secondary transferring device 22, the image is transferred to the printing material S with the secondary transferring device 22, so that the color image is recorded on the printing material S.

The printing material S after the image transferring is delivered by the secondary transferring belt 24 of the secondary transferring device 22 to the fixing device 25. The heat and the pressure are applied to the printing material S with the fixing device 25 and the transferred image is fixed. After the image fixing, the sheet passage is switched by the change-over lever 55, the printing material S is discharged with the discharge roller 56, and stacked on the ejection tray 57.

Moreover, when taking the double-sided copy in which the image is copied to both sides of the printing material S, the other sheet passage is switched by the change-over level 55, the printing material S is sent to the printing material reversal device 28, it is reversed there, and led to the transferring position again. The image-formation process that is the same as mentioned above is performed so that the image is recorded also on the back surface of the printing material S. The printing material S is discharged to the ejection tray 57 with the discharge roller 56.

On the other hand, the intermediate transferring belt 10 after the image transferring is passed by the intermediate-transfer-medium cleaning device 17, the remaining toner which remains on the intermediate transferring belt 10 after the image transferring is removed by the cleaning device 17, and the intermediate transferring belt 10 is prepared for the image formation of the tandem type image-formation section 20 at the subsequent time.

Moreover, the leading edges of the photoconductor cleaning devices 63Y, 63M, 63C, and 63B which are the toner recovery units to remove and collect the toners which remain on the photoconductor after the primary transferring are brought in contact with the photoconductors 40Y, 40M, 40C, and 40B. For example, the cleaning blades 75Y, 75M, 75C, and 75B made of the polyurethane rubber are disposed there.

Moreover, in order to raise the cleaning capability, the brush whose periphery is in contact with the photoconductors 40Y, 40M, 40C, and 40B are used together. In this example, the conductive fur brushes 76Y, 76M, 76C, and 76B whose periphery contact the photoconductors 40Y, 40M, 40C, and 40B are arranged so that they are freely rotatable in the direction indicated by the arrow.

And the fur brushes 76Y, 76M, 76C, and 76B which are rotated in the rotation direction opposite to that of the photoconductors 40Y, 40M, 40C, and 40B are used to remove the remaining toner on the photoconductors 40Y, 40M, and 40C and 40B.

The removed toner of each color is sent from the photoconductor cleaning devices 63Y, 63M, 63C, and 63B to the developing devices 61Y, 61M, 61C, and 61B, respectively. The toner is returned to the toner supply regions 66Y, 66M, 66C, and 66B of the developing devices 61Y, 61M, 61C, and 61B by the toner transport device (toner recycling unit) 80 which conveys the toner whose recovery is carried out in the developing device, and is again used for the development.

In the example of FIG. 2, only the toner transport device (toner recycling unit) 80 at the right-side end image-formation unit 18B is illustrated for the sake of convenience. However, the same toner transport devices (toner recycling units) 80 are also disposed at the other image-formation units 18Y, 18M, and 18C.

In the foregoing, the composition and operation of the tandem type color copier device using the intermediate transferring medium has been described. However, the present invention is not limited to the above embodiment.

Figure 3:
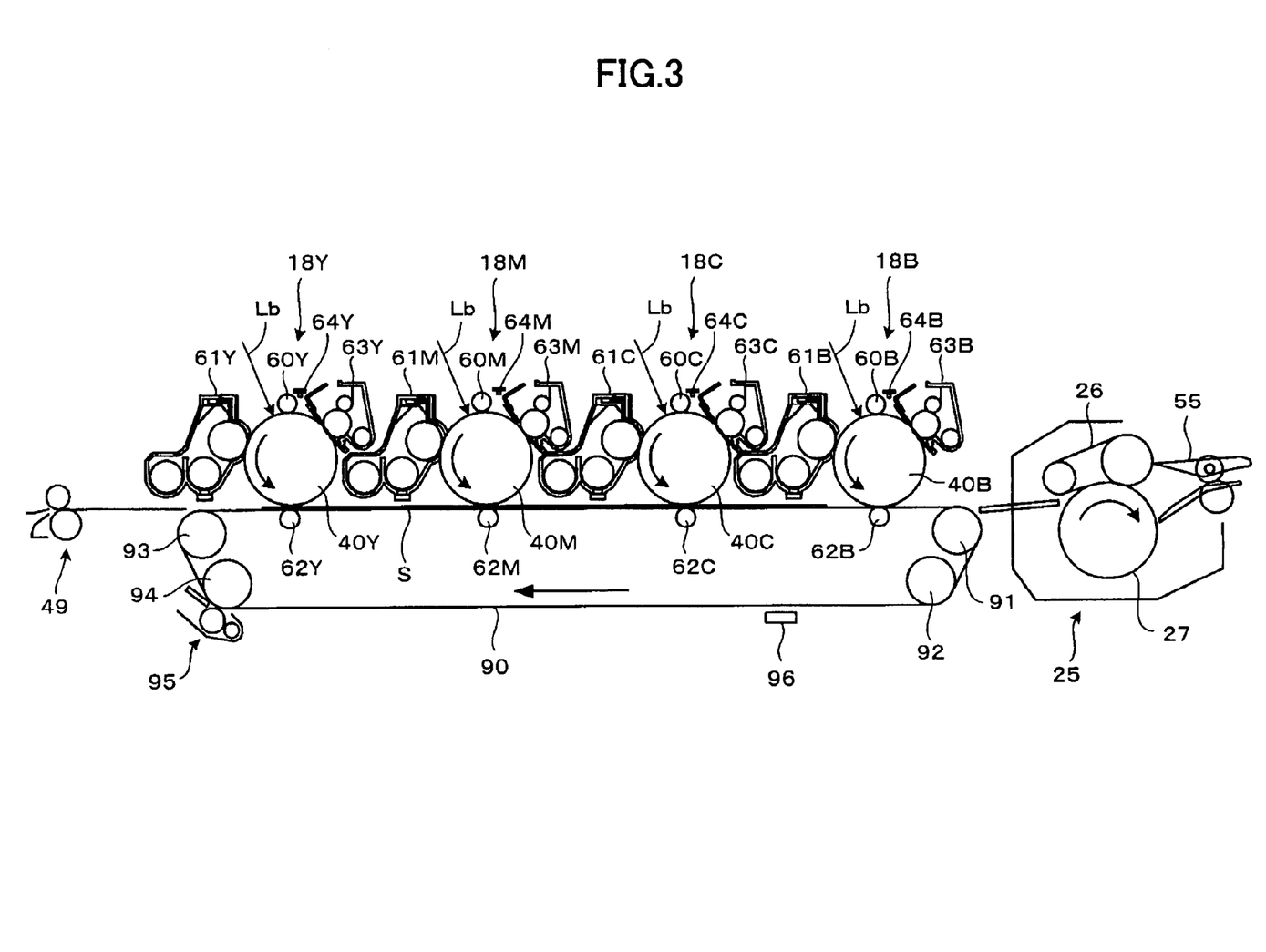
FIG. 3 is a diagram showing the composition of another preferred embodiment of the image forming device of the invention.

Next, FIG. 3 shows the composition of the tandem type color image forming device using the direct transferring method in which the image forming device of the invention is embodied.

In the image forming device of FIG. 3, the intermediate transferring belt 10 of FIG. 2 is replaced with the transfer medium (called the transferring belt) 90 which is in the form of an endless belt provided to support and convey the printing material S.

The transferring belt 90 is wound on the four support rollers 91-94 so that it is rotatable in the clockwise rotation direction as indicated by the arrow in FIG. 3.

In this embodiment, the transfer medium cleaning device 95 which removes the toner and the paper chips adhering to the support roller 94 at the time of the image transferring is disposed at the bottom portion of the transferring belt 90.

Moreover, on the transferring belt 90 stretched between the support roller 91 and the support roller 93 among the four rollers, the four image-formation units 18Y, 18M, 18C, and 18B of the yellow (Y), the magenta (M), the cyan (C), and the black (B) are arranged side by side horizontally, along the conveyance direction. The four image-formation units form the tandem type image-formation section.

And the image of each color formed with the image-formation units 18Y, 18M, 18C, and 18B is directly transferred to the printing material S. The printing material S is the paper which is fed from the feed region (not illustrated), sent to the transferring belt 90 through the resist roller 49, and conveyed by the transferring belt 90.

And the printing material S after the image transferring is conveyed to the fixing device 25, and it is fixed to the image there.

In addition, the exposure device (not shown) which is the writing unit, the image-formation units 18Y, 18M, 18C, and 18B, and the fixing device 25 in the embodiment of FIG. 3 are the same as the corresponding components of FIG. 1 and FIG. 2, and a description thereof will be omitted for the sake of convenience.

In the above-described image forming device of the invention, after the images of the different colors are formed on the photoconductor drums 40Y, 40M, and 40C and 40B, the images of the different colors are transferred one by one to the printing material S in an integrated manner by the intermediate transferring belt 10 shown in FIG. 1 or FIG. 2, or the transferring belt 90 shown in FIG. 3, so that the multi-color or color image is formed.

Since the images of the different colors are respectively formed with the different optical systems and the different photoconductor drums in the tandem-type image forming device, there is the problem in that the color deviation may take place due to the deviation of the writing position or the deviation of the transferring position when the images of the different colors are transferred to the printing material S conveyed by the intermediate transferring belt 10 or the transferring belt 90.

To obviate the problem, the present invention provides a method of compensating the color deviation arising by the deviation of the writing position or the deviation of the transferring position.

Figure 5:
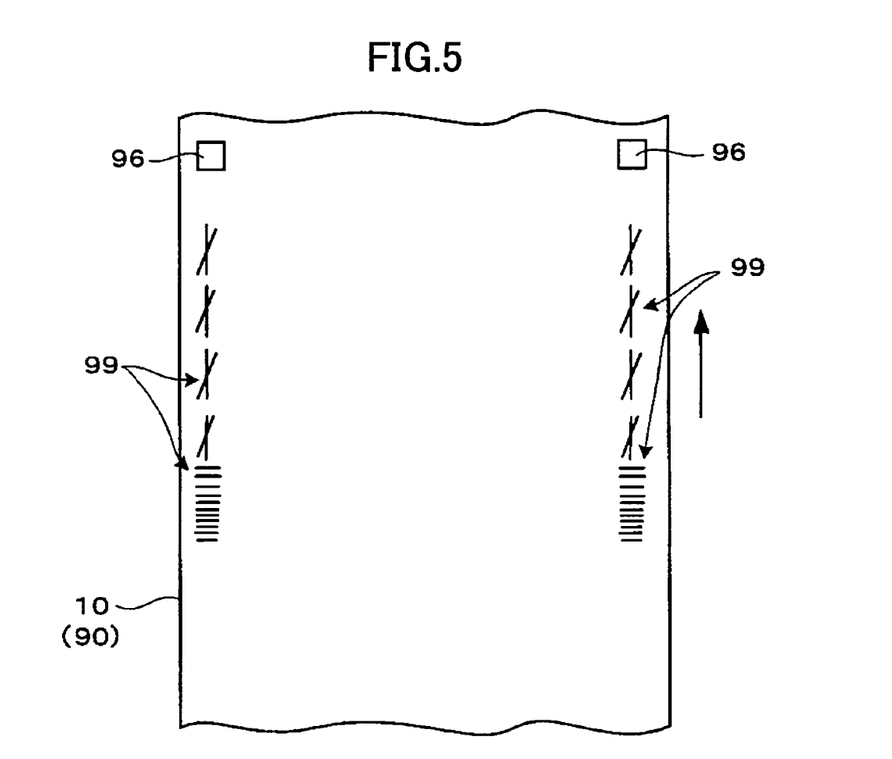
FIG. 5 is a diagram showing an example of the pattern formed on the intermediate transferring belt or the transferring belt, and an example of the arrangement of the pattern detection sensor.

As shown in FIG. 2 or FIG. 3, and FIG. 5, the pattern detection sensors 96 are disposed at the downstream side of the image-formation unit in the image conveyance direction, each sensor comprising the light emitting device and the photo detector and facing the intermediate transferring belt 10 or the transferring belt 90. Moreover, the deviation detection patterns 99 of the different colors are formed on the photoconductor drums 40Y, 40M, 40C, and 40B and transferred to the intermediate transferring belt 10 or the transferring belt 90. The patterns 99 arranged on the intermediate transferring belt 10 or the transferring belt 90 are optically read by the photo detectors of the pattern detection sensors 96, and detection and compensation of the amount of position deviation is carried out.

The pattern detection sensors 96 are usually disposed on the both sides of the intermediate transferring belt 10 or the transferring belt 90 in the width direction, and the light beam emitted by the light emitting device (for example, the light emitting diode, the semiconductor laser, etc.) of each sensor 96 is irradiated to the intermediate transferring belt 10 or the transferring belt 90, and the reflected light (or the reflective scattering light) from the intermediate transferring belt 10 or the transferring belt 90 is received by the photo detector of each sensor 96.

The photo detector used may be the photo diode or the image pickup element, such as CCD, etc. The slit or the like is disposed on the front face of the photo detector, if needed.

Alternatively, when the intermediate transferring belt 10 or the transferring belt 90 is made of a transparent material, the penetration type composition may be used in which the light which penetrates the intermediate transferring belt 10 or the transferring belt 90 is received by the photo detector.

Figure 4:
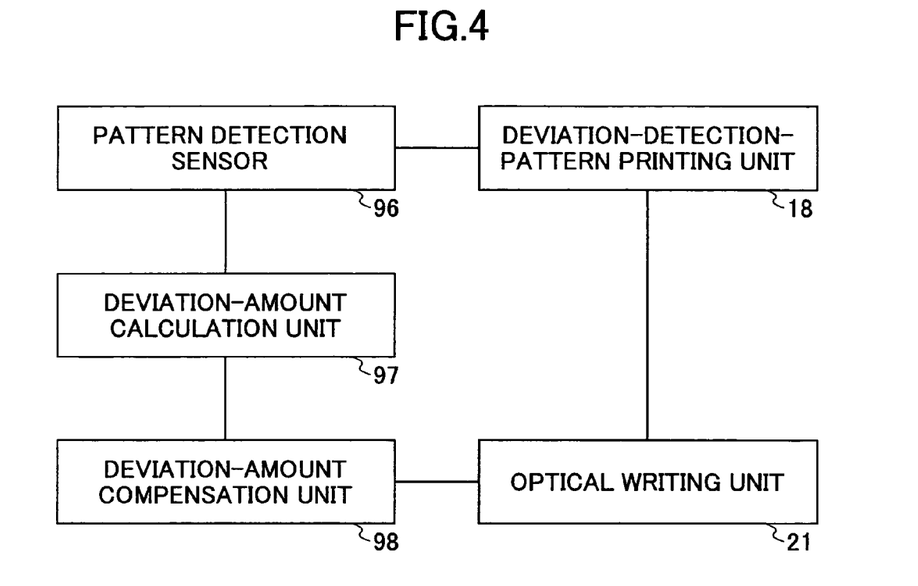
FIG. 4 is a block diagram showing the functional composition of the control unit in one embodiment of the image forming device of the invention for controlling the position deviation detection and compensation.

FIG. 4 shows the functional composition of the control unit in one embodiment of the image forming device of the invention which controls detection of the amount of position deviation using the pattern detection sensor 96 and compensation of the detected amount of position deviation by correcting the optical systems or the timing of image writing.

Figure 6:
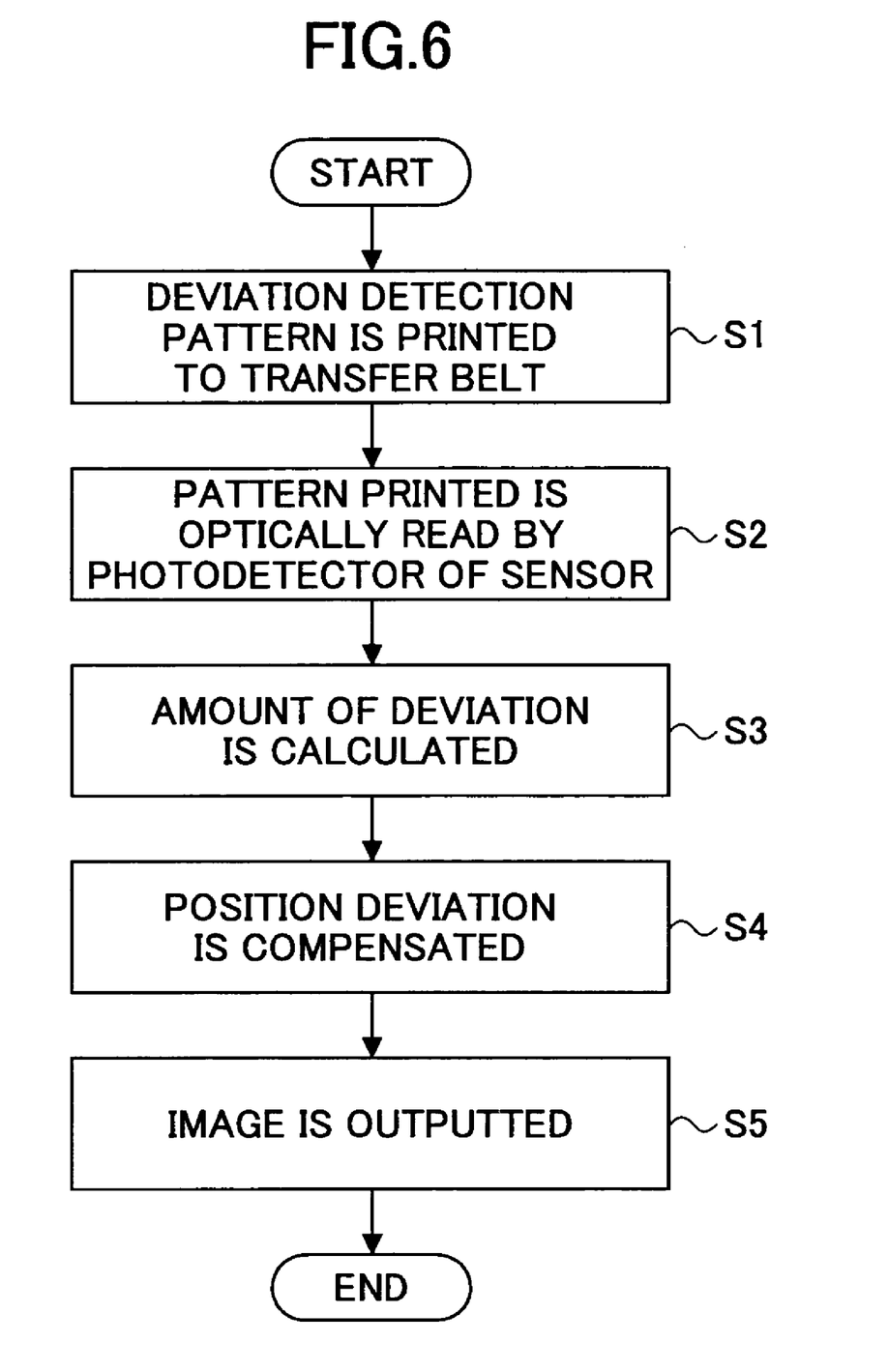
FIG. 6 is a flowchart for explaining the procedure of the position deviation detection and compensation control.

Specifically, as shown in the flowchart of FIG. 6, the latent-image pattern for position deviation detection is optically written to the photoconductor drums 40Y, 40M, 40C, and 40B by the optical writing unit (exposure device) 21. After the latent-image patterns are developed by the deviation-detection-pattern printing units (image-formation units) 18Y, 18M, 18C, and 18B, the patterns are transferred to the intermediate transferring belt 10 or the transferring belt 90 (S1). FIG. 5 shows an example of the patterns 99 transferred (or printed) to the intermediate transferring belt 10 or the transferring belt 90.

Next, the patterns 99 formed on the intermediate transferring belt 10 or the transferring belt 90 are read by the photo detector of the pattern detection sensor 96 (S2), the amount of position deviation is computed by the deviation-amount calculation unit 97 (S3), and the position deviation is compensated by the deviation-amount compensation unit 98 (which compensates the writing timing or the optical systems) (S4).

The image without the color deviation can be obtained by performing the image output after this compensation is carried out (S5).

In addition, the patterns 99, which are formed on the intermediate transferring belt 10 or the transferring belt 90 when performing the position deviation detection, are removed by the intermediate-transfer-medium cleaning device 17 or the transfer medium cleaning device 95 after the position deviation detection is performed.

As previously described with reference to FIG. 10, in the method of the position deviation detection and compensation according to the related art, the plurality of sets of patterns 1 and 2 of the different colors are used for detecting the amount of position deviation in the main scanning direction. The first patterns 1 are made in the color with high sensor sensitivity (any of the yellow, the magenta, and the cyan), and the second patterns 2 are made in the color with low sensor sensitivity (the black). These patterns are arranged in the vertical posture along the reading direction of the pattern detection sensor 96 which includes the light emitting device and the photo detector.

In detecting the amount of position deviation in the main scanning direction from the output of each detection pattern, if the patterns 1 of the color with high sensor sensitivity greatly deviate from the patterns 2 in the fixed position, some of the patterns 1 are completely separated from the sensor sensitivity region as shown in FIG. 11, and there is the problem that the exact amount of position deviation cannot be detected.

Moreover, as previously described with reference to FIG. 12, in the method of the position deviation detection and compensation according to the related art, the plurality of sets of the patterns 1 and 2 of the different colors are used for detecting the amount of position deviation in the sub-scanning direction. The first patterns 1 are made in the color with high sensor sensitivity (any of the yellow, the magenta, and the cyan), and the second patterns 2 are made in the color with low sensor sensitivity (the black). These patterns are arranged in the horizontal posture along the reading direction of the pattern detection sensor 96 which includes the light emitting device and the photo detector.

In the above method according to the related art, the first interval at which the patterns 1 of the color with high sensor sensitivity are arranged is shifted slightly from the second interval at which the patterns 2 of the color with low sensor sensitivity are arranged as the reference patterns such that the first interval is smaller than the second interval. The overlapping amount of the pattern 1 and the pattern 2 of each set varies according to the reading direction of the sensor, the plurality of patches are formed with the plurality of sets of the patterns 1 and 2.

However, when the patterns 1 and the patterns 2 are arranged by this method to detect the amount of position deviation in the sub-scanning direction, the sensor sensitivity region in the neighborhood of the reference patch where the patterns 1 and 2 of the two colors completely match each other is affected by the outputs of the sensor from the patterns 1 of the two neighboring patches adjacent to the reference patch, and it is difficult to attain the detection of the exact amount of position deviation.

To obviate the problems, the position deviation detecting method in the preferred embodiment of the invention is provided to detect the amount of position deviation in the main scanning direction between two of the plurality of colors, as follows.

Figure 7:
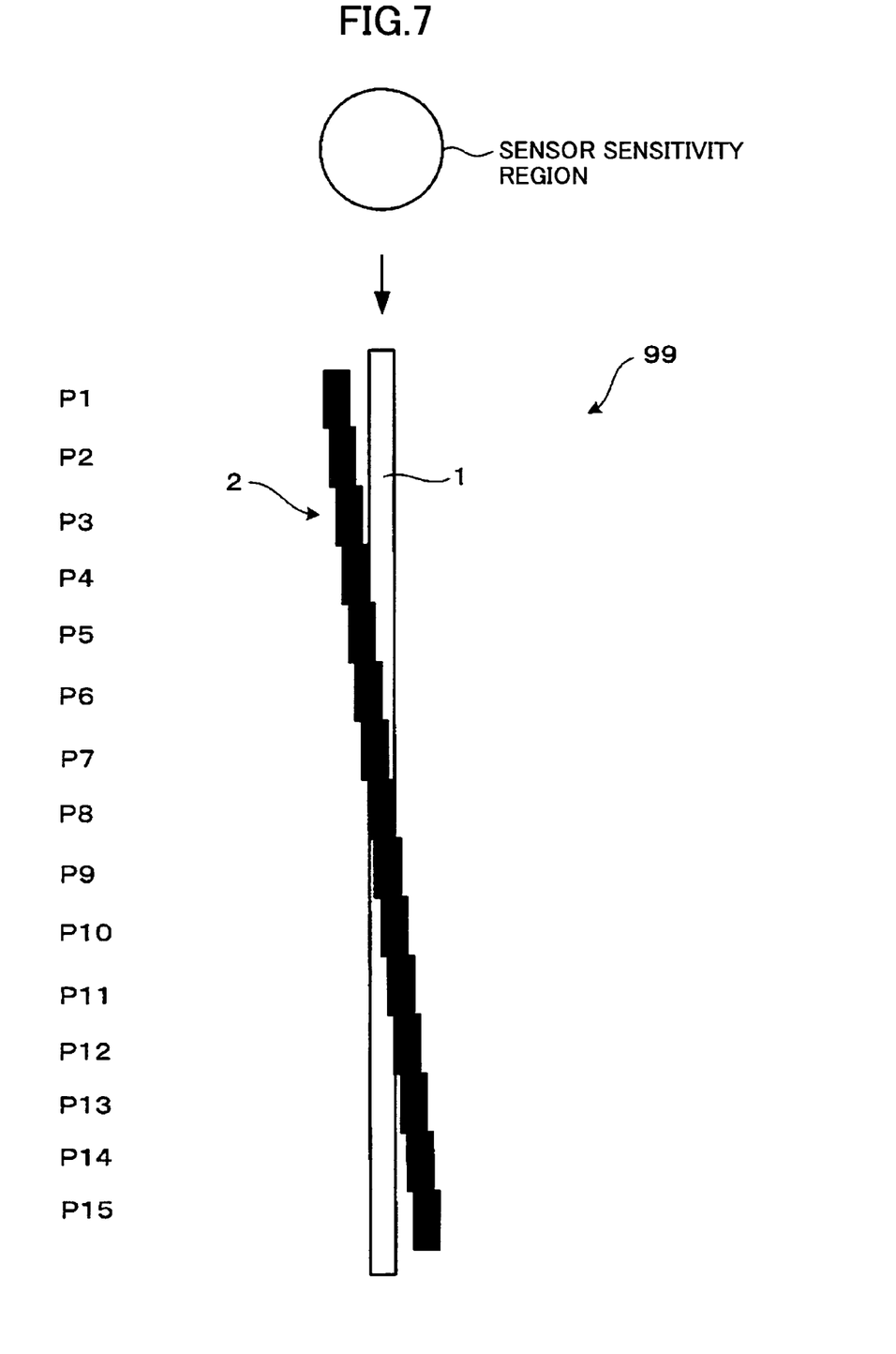
FIG. 7 is a diagram showing an example of the pattern according to the invention when detecting the amount of position deviation in the main scanning direction between two of the plurality of colors.

As shown in FIG. 7, the plurality of patterns 1 of the color with high sensor sensitivity (any of the yellow, the magenta or the cyan) are arranged in the fixed position in the main scanning direction, and the plurality of patterns 2 of the color with low sensor sensitivity (the black) are shifted in the main scanning direction from the patterns 1 and arranged slantingly to the patterns 1 as indicated by P1 to P15 in FIG. 7.

In the position deviation detecting method of the present embodiment, the output values by the photo detector of the pattern detection sensor 96 are measured from these patterns, and the amount of position deviation in the main scanning direction is computed based on the measured output values.

Figure 8:
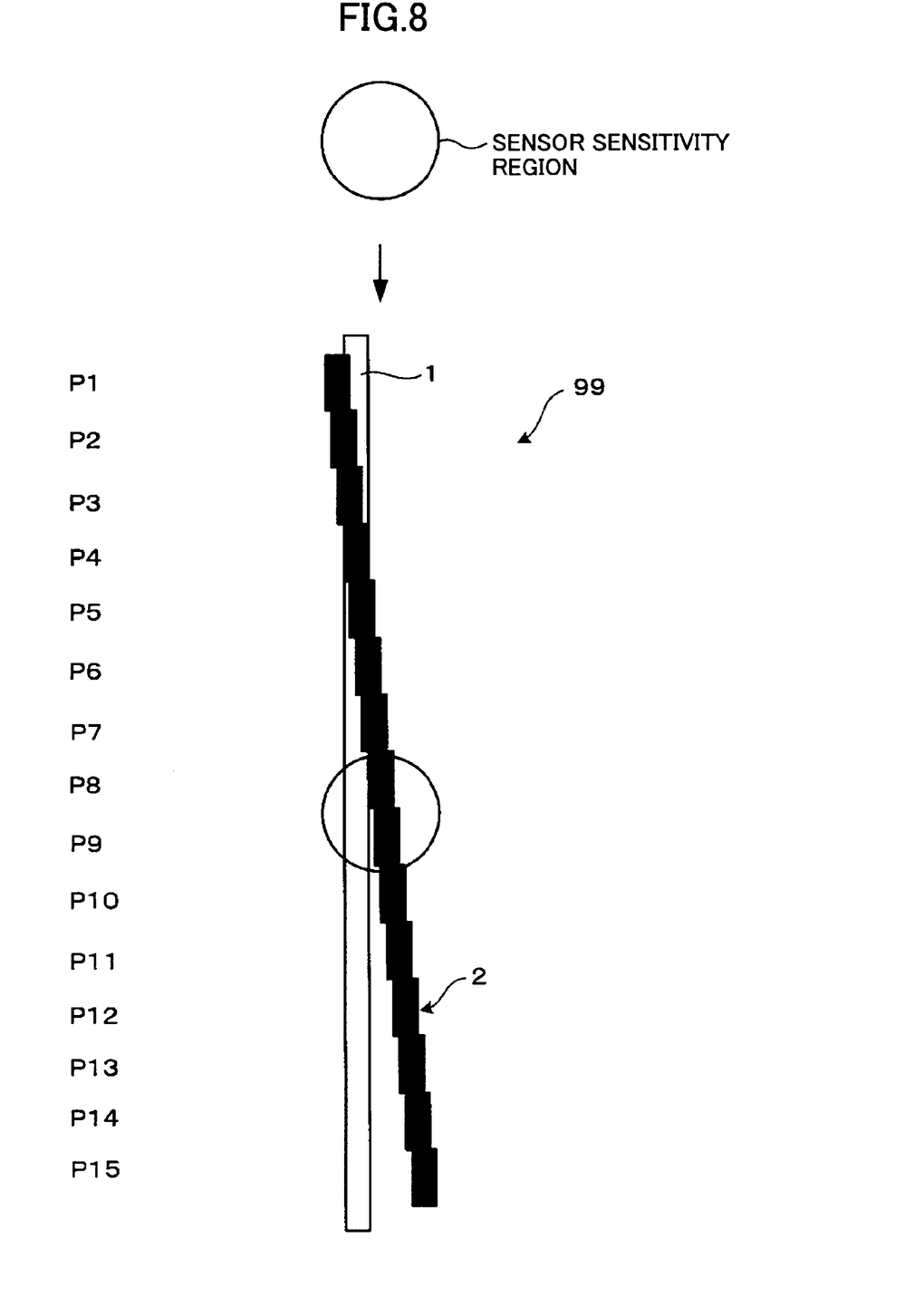
FIG. 8 is a diagram for explaining the case in which the position deviation arises with the pattern of FIG. 7.

Accordingly, even when the patterns 2 deviate from the patterns 1 in the first position or the sensor mounted positions deviate from the desired positions, the possibility that the patterns 1 of the color with high sensor sensitivity be separated from the sensor sensitivity region can be reduced remarkably as shown in FIG. 8. Thus, it is possible to reduce the reading failure or the incorrect detection.

Moreover, to obviate the problems, the position deviation detecting method in the preferred embodiment of the invention is provided to detect the amount of position deviation in the sub-scanning direction between two of the plurality of colors, as follows.

Figure 9:
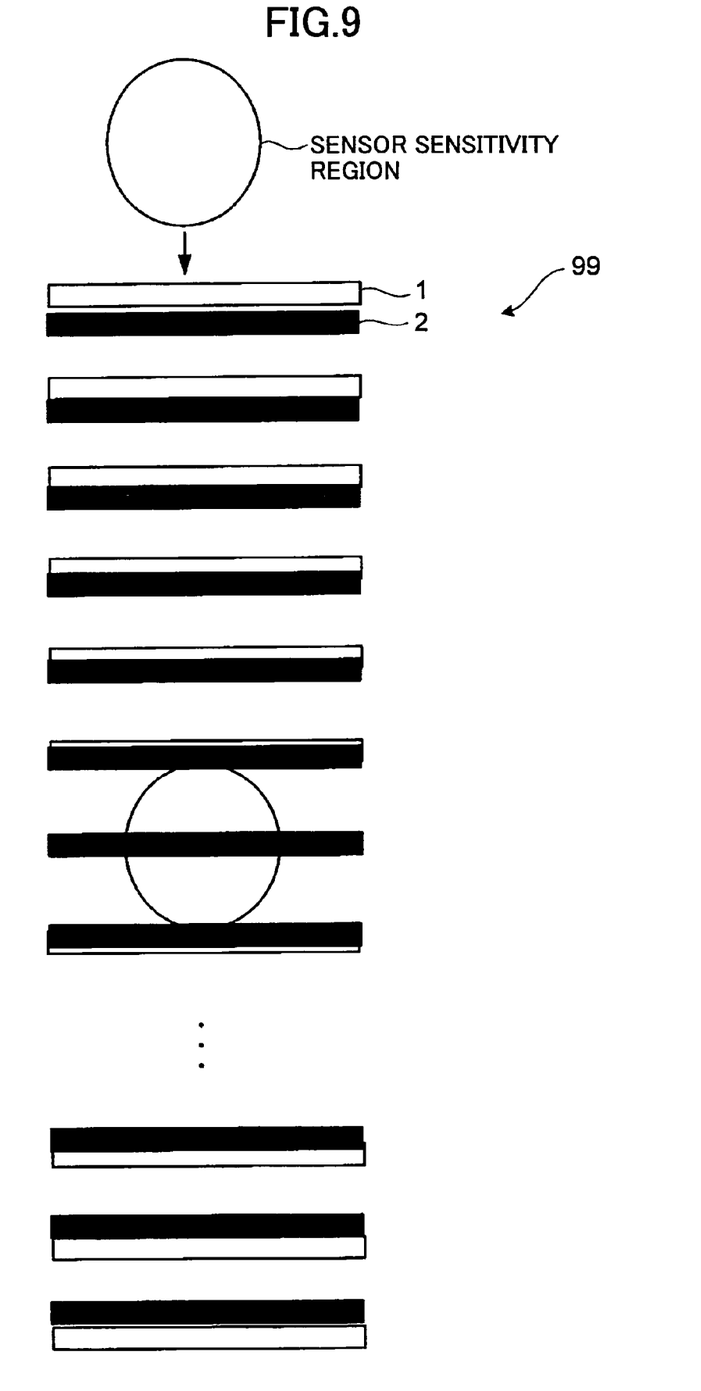
FIG. 9 is a diagram showing an example of the pattern according to the invention when detecting the amount of position deviation in the sub-scanning direction between two of the plurality of colors.

As shown in FIG. 9, the plurality of patterns 1 of the color with high sensor sensitivity (any of the yellow, the magenta or the cyan) are arranged in the horizontal posture at the first intervals along the sub-scanning direction (as the reference patterns), and the plurality of patterns 2 of the color with low sensor sensitivity (the black) are arranged in the horizontal posture at the second intervals along the sub-scanning direction such that the patterns 2 are slightly shifted from the patterns 1 as the reference patterns in the sub-scanning direction and the second interval is smaller than the first interval as shown in FIG. 9. The overlapping amount of the pattern 1 and the pattern 2 of each set varies according to the reading direction of the sensor 96, and the plurality of patches are formed with the plurality of sets of the patterns 1 and 2.

In the position deviation detecting method of the present embodiment, the output values by the photo detector of the pattern detection sensor 96 is measured from these patterns, and the amount of position deviation in the sub-scanning direction is computed based on the measured output values.

Accordingly, it is possible to detect the amount of position deviation in the sub-scanning direction with sufficient accuracy, and it is possible to reduce the reading failure and the incorrect detection. Specifically, as shown in FIG. 9, it is possible to prevent the sensor sensitivity region in the neighborhood of the reference patch (where the patterns 1 and 2 of the two colors completely match each other) from being affected by the outputs of the sensor from the patterns 1 of the neighboring patches adjacent to the reference patch.

In the above-described embodiments, the pattern 1 of the color with high sensor sensitivity high is made in any of the yellow, the magenta, and the cyan, and the pattern 2 of the color with low sensor sensitivity is made in the black. However, the present invention is not limited to these embodiments. Alternatively, the pattern 1 of the color with high sensor sensitivity may be made in the yellow, for example, and the pattern 2 of the color with low sensor sensitivity may be made in any of the magenta, the cyan, and the black.

Namely, what is necessary is just to form the patterns 99 as shown in FIG. 7 or FIG. 9 by using arbitrary two colors of the plurality of colors, and setting the color with the higher sensor sensitivity of the two colors as the patterns 1 and setting the color with the lower sensor sensitivity as the patterns 2.

Moreover, if the patterns 99 of FIG. 7 and the patterns 99 of FIG. 9 are continuously formed on the transferring belt as shown in FIG. 5 and the pattern detection sensors 96 detect these patterns one by one, the detection and the compensation of the amount of position deviations in the main scanning and sub-scanning directions can be performed continuously.

The position deviation detecting method of the above-described embodiments can be suitably applied to the multi-color or color image forming devices, such as the copiers, the printers, the plotters, the facsimiles, and the printers, and can attain the image formation without the color deviation.

The present invention is not limited to the above-described embodiments, and variations and modifications may be made without departing from the scope of the present invention.

Further, the present application is based on Japanese patent application No. 2004-045077, filed on Feb. 20, 2004, the entire contents of which are hereby incorporated by reference.

What is claimed is:

1. A position deviation detecting method for use in an image forming device which forms a multi-color or color image on a printing material by transferring images of a plurality of colors, formed on image supporting mediums arranged in parallel, to the printing material which is conveyed with an intermediate transfer medium or a transfer medium such that different colored images are formed on top of each other, the position deviation detecting method comprising the steps of:

transferring first and second patterns formed in different colors on the image supporting mediums to the intermediate transfer medium or the transfer medium in an overlapping manner, the first patterns formed in a color with high sensor sensitivity and the second patterns formed in a color with low sensor sensitivity;

reading the first and second patterns on the intermediate transfer medium or the transfer medium using a light-receiving unit of a pattern detection sensor; and detecting an amount of position deviation in a main scanning direction between two of the plurality of colors, wherein the first patterns are arranged in a fixed position in the main scanning direction and the second patterns are shifted in the main scanning direction such that the second patterns are overlapped over the first patterns, and output values of the light-receiving unit of the sensor are measured from the first and second patterns, and the amount of position deviation in the main scanning direction is computed based the measured output values.

2. A position deviation detecting method for use in an image forming device which forms a multi-color or color image on a printing material by transferring images for a plurality of colors, formed on image supporting mediums arranged in parallel, to the printing material which is conveyed with an intermediate transfer medium or a transfer medium such that different colored images are formed on top of each other, the position deviation detecting method comprising the steps of:

transferring first and second patterns formed in different colors on the image supporting mediums to the intermediate transfer medium or the transfer medium in an overlapping manner, the first patterns formed in a color with high sensor sensitivity and the second patterns formed in a color with low sensor sensitivity;

reading the first and second patterns on the intermediate transfer medium or the transfer medium using a light-receiving unit of a pattern detection sensor; and detecting an amount of position deviation in a sub-scanning direction between two of the plurality of colors, wherein the first patterns are arranged in horizontal posture at intervals of a first distance along the sub-scanning direction and the second patterns are arranged in horizontal posture at intervals of a second distance smaller than the first distance along the sub-scanning direction, and each second pattern is shifted from each first pattern such that an overlapping amount of the first pattern and the second pattern varies according to the sub-scanning direction and a plurality of patches are formed, and output values of the light-receiving unit of the sensor are measured from the first and second patterns, and the amount of position deviation in the sub-scanning direction is computed based the measured output values.

3. An image forming device which forms a multi-color or color image on a printing material by transferring images in a plurality of colors, formed on image supporting mediums arranged in parallel, to the printing material which is conveyed with an intermediate transfer medium or a transfer medium such that different colored images are formed on top of each other, the image forming device comprising:

a deviation-detection-pattern printing unit transferring first and second patterns formed in different colors on the image supporting mediums to the intermediate transfer medium or the transfer medium in an overlapping manner, the first patterns formed in a color with high sensor sensitivity and the second patterns formed in a color with low sensor sensitivity; and a pattern detection sensor including a light-emitting unit and a light-receiving unit, the light-receiving unit reading the first and second patterns on the intermediate transfer medium or the transfer medium using a light-receiving unit of a pattern detection sensor;

wherein the pattern detection sensor detects an amount of position deviation in a main scanning direction between two of the plurality of colors, and wherein the first patterns are arranged in a fixed position in the main scanning direction and the second patterns are arranged slatingly with respect to the first patterns and shifted in the main scanning direction such that the second patterns are overlapped over the first patterns, and output values of the light-receiving unit of the sensor are measured from the first and second patterns, and the amount of position deviation in the main scanning direction is computed based the measured output values.

4. An image forming device which forms a multi-color or color image on a printing material by transferring images in a plurality of colors, formed on image supporting mediums arranged in parallel, to the printing material which is conveyed with an intermediate transfer medium or a transfer medium such that different colored images are formed on top of each other, the image forming device comprising:

a deviation-detection-pattern printing unit transferring first and second patterns formed in different colors on the image supporting mediums to the intermediate transfer medium or the transfer medium in an overlapping manner, the first patterns formed in a color with high sensor sensitivity and the second patterns formed in a color with low sensor sensitivity; and a pattern detection sensor including a light-emitting unit and a light-receiving unit, the light-receiving unit reading the first and second patterns on the intermediate transfer medium or the transfer medium using a light-receiving unit of a pattern detection sensor;

wherein the pattern detection sensor detects an amount of position deviation in a sub-scanning direction between two of the plurality of colors, and wherein the first patterns are arranged in horizontal posture at intervals of a first distance along the sub-scanning direction and the second patterns are arranged in horizontal posture at intervals of a second distance smaller than the first distance along the sub-scanning direction, and each second pattern is shifted from each first pattern such that an overlapping amount of the first pattern and the second pattern varies according to the sub-scanning direction and a plurality of patches are formed, and output values of the light-receiving unit of the sensor are measured from the first and second patterns, and the amount of position deviation in the sub-scanning direction is computed based the measured output values.

* * * * *